(12) United States Patent
Zaghdoud

(10) Patent No.: US 10,320,974 B2
(45) Date of Patent: Jun. 11, 2019

(54) PRESENCE SYSTEMS, PRESENCE SERVERS AND PRESENCE AGENTS

(71) Applicant: ALE INTERNATIONAL, Colombes (FR)

(72) Inventor: Moussa Zaghdoud, Strasbourg (FR)

(73) Assignee: ALE INTERNATIONAL, Colombes (FR)

( * ) Notice: Subject to any disclaimer, the term of this patent is extended or adjusted under 35 U.S.C. 154(b) by 0 days.

(21) Appl. No.: 15/775,493

(22) PCT Filed: Dec. 21, 2015

(86) PCT No.: PCT/IB2015/059823
§ 371 (c)(1),
(2) Date: May 11, 2018

(87) PCT Pub. No.: WO2017/081525
PCT Pub. Date: May 18, 2017

(65) Prior Publication Data
US 2018/0375992 A1    Dec. 27, 2018

(30) Foreign Application Priority Data
Nov. 13, 2015  (EP) .................................... 15306795

(51) Int. Cl.
*H04M 3/42*    (2006.01)
(52) U.S. Cl.
CPC ..... *H04M 3/42374* (2013.01); *H04M 3/4211* (2013.01); *H04M 3/42068* (2013.01); *H04M 3/42365* (2013.01)
(58) Field of Classification Search
CPC ........... H04M 3/4211; H04M 3/42374; H04M 3/42068; H04M 3/42365
(Continued)

(56) References Cited

U.S. PATENT DOCUMENTS

| | | | |
|---|---|---|---|
| 6,950,507 B1 * | 9/2005 | Kaplan .................. | H04M 15/06 379/142.01 |
| 7,555,108 B2 * | 6/2009 | Sylvain ............. | H04M 3/42195 379/207.02 |

(Continued)

FOREIGN PATENT DOCUMENTS

KR    100710527 B1    4/2007

OTHER PUBLICATIONS

International Search Report with regard to PCT/IB2015/059823 dated Mar. 18, 2016.
(Continued)

Primary Examiner — Harry S Hong
(74) Attorney, Agent, or Firm — BCF LLP

(57) ABSTRACT

The invention namely provides a presence server (103) comprising:
  a data repository in which is stored a plurality of user (106, 107) identities recorded in association with at least one device address and a status,
  an input interface for receiving a busy or available status updating request (2) comprising an address of a calling device (201) and a called user (107) identity of a user of a called device (202),
  a processing unit configured to: when the input interface receives the busy status updating request (2):
  retrieve from the data repository a calling user (106) identity,
  change the status associated to the calling user (106) identity into a busy status, when the input interface receives the available status updating request (7), change the status associated to the calling user identity into an available status,
  an output interface to access the status of user identities.

12 Claims, 8 Drawing Sheets

(58) Field of Classification Search
USPC .................................... 379/201.01, 211.01
See application file for complete search history.

(56) References Cited

U.S. PATENT DOCUMENTS

| | | |
|---|---|---|
| 2004/0062383 A1 | 4/2004 | Sylvain |
| 2004/0170263 A1 | 9/2004 | Michael et al. |
| 2004/0205175 A1 | 10/2004 | Kammerer |
| 2005/0102297 A1 | 5/2005 | Lloyd et al. |
| 2005/0141691 A1* | 6/2005 | Wengrovitz ............ H04L 51/04 379/211.02 |
| 2007/0081517 A1* | 4/2007 | Booton .................. H04L 63/08 370/352 |
| 2008/0005119 A1 | 1/2008 | Fernandez et al. |
| 2011/0026517 A1* | 2/2011 | Capuozzo ......... H04M 3/42323 370/352 |

OTHER PUBLICATIONS

English Description and Claims for KR100710527 retrieved on Espacenet on May 10, 2018.
European Search Report with regard to EP15908235.3 completed Apr. 17, 2019.

\* cited by examiner

User information

- Nick Name: Moussa
- First Name:
- Last Name:
- Organization Name:
- Organization Unit:
- Title: Manager
- Work Phone: 0390675117
- Work Cell Phone: 061919199
- Home Phone: 390675117
- Work City: OXO – PARIS
- Email: moussa.zaghdoud@gmail.com
- Google Account:
- Ud FaceBook:
- Ud Twitter:
- Ud Linkedin:
- Ud Google+:
- Ud Youtube:
- Web Site:

Login: ZAGHOUD Moussa
Password: ********
Edn: 9055

☐ Out Of Office

☐ SMS Notification

Save

FIG. 4

PRESENCE SYSTEMS, PRESENCE SERVERS AND PRESENCE AGENTS

FIELD OF THE INVENTION

The invention relates to presence systems, presence servers and presence agents.

BACKGROUND

Communication systems are known wherein a communication session is launched between a first phone and a second phone. In some implementation, the server to which the first phone belongs notifies an operator central server that the first phone is currently busy in an established communication session. A employed herein, a communication device belongs to a company means that the communication device is connected to a private communication network of the company by the Private Branching Exchange (PBX) of the company.

SUMMARY

An idea at the basis of the invention is to provide a communication system in which the private network of a company to which the second phone belongs notifies a presence server that the first phone is busy in an established communication session.

An aspect of the invention is to allow the presence server to take into account phone numbers which are not registered in the server to which the phones belong. An aspect of the invention is to allow the presence server to take into account phone numbers allocated to phone devices that do not support any presence application programs.

An idea at the basis of the invention is to process presence information homogeneously in a complex heterogeneous communication system, for example a communication system comprising phones supporting a dedicated embedded application and analogical phones.

In an embodiment, the invention provides a presence server comprising:
a data repository in which is stored a directory of users on a communication network, comprising a plurality of user identities, each user identity identifying a user in association with at least one device address and being further associated with a status, wherein the status is either busy or available,
an input interface configured for receiving a busy status updating request from a presence agent connected to the communication network, the busy status updating request comprising an address of a calling device and a called user identity of a user of a called device, and the input interface is further configured for receiving an available status updating request from the presence agent, the available status updating request comprising the called user identity and the calling user identity,
a processing unit configured to, when the input interface receives the busy status updating request:
retrieve from the data repository a calling user identity, wherein the calling user identity is the user identity recorded in association with the address of the calling device,
change the status associated with the retrieved calling user identity into a busy status,
and further configured to, when the input interface receives the available status updating request:
change the status associated to the retrieved calling user identity into an available status, and
an output interface for enabling users to access the statuses associated with user identities.

Thanks to these features, presence information can be managed, i.e. collected, updated and made available, homogeneously for diverse communication devices. In an embodiment, a user calling from an analogic phone device whose phone number is registered in the data repository of the presence server can have his status updated.

According to embodiments, such a presence server may comprise one or more of the features below.

In an embodiment, the processing unit is further configured to:
when the input interface receives the busy status updating request:
change the status associated with the called user identity into a busy status, and when the input interface receives the available status updating request:
change the status associated to the called user identity into an available status.

In an embodiment, the output interface of the presence server is further configured to broadcast the status associated with all or part of the user identities to communication devices whose device addresses are recorded in association with the user identities of the user directory.

Diverse formats may be employed for the user identities. In an embodiment, the user identities comprised in the user directory are stored in VCards in the user directory. In an embodiment, the user identities are Jabber Unique Identifiers (JID).

There are many messaging and signaling systems and protocols which may be used to implement the processing unit. In embodiments, Session Initiation Protocol (SIP), various webservices or Computer Supported Telecommunications Applications (CSTA) may be used. In an embodiment, the processing unit is an Extensible Messaging and Presence Protocol (XMPP) server and the data repository comprises XMPP accounts for each user. In an embodiment, XMPP is defined by IETF in RFC6120.

In an embodiment, the invention provides a presence agent comprising:
a memory in which is stored a set of addresses of devices connected to a communication network in association with user identities, and
a processing unit configured to, in response to receiving a request for establishing a communication session between a calling device and a called device, the request comprising an address of the calling device and an address of the called device:
retrieve a called user identity in the memory, wherein the called user identity is the user identity associated with the called device address, and
transmit a busy status updating request to a presence server connected to the communication network, the busy status updating request comprising the address of the calling device and the called user identity,
the processing unit being further configured to, in response to receiving a request for terminating a communication session between a calling device and a called device, the request comprising an address of the calling device and an address of the called device whose address is stored in the memory:
transmit an available status updating request to the presence server, the available status updating request comprising the calling user identity and the called user identity.

According to embodiments, such a presence agent may comprise one or more of the features below.

In an embodiment, the processing unit is further configured to establish the communication session between the calling device and the called device prior to transmitting the busy status updating request.

In an embodiment, the processing unit is further configured to receive a response from the presence server in response to transmitting the busy status updating request, wherein the response comprises a calling user identity.

In an embodiment, the processing unit of the presence server is further configured to send the response in an Extensible Markup Language (XML) format.

In an embodiment, the processing unit is further configured to send the busy status updating request or available status updating request in a Structured Query Language (SQL) format.

In an embodiment, the invention provides a presence system comprising a presence server as hereinabove described and a first presence agent as hereinabove described, wherein the input interface of the presence system and the processing unit of the presence agent are configured to communicate with each other.

According to embodiments, such a presence system may comprise one or more of the features below.

In an embodiment, the presence system further comprises a second presence agent, wherein an address of the second presence agent is further stored in the data repository of the presence server in association with the calling user identity, wherein the processing unit of the presence server is further configured to send a response to the first presence agent when the input interface of the presence server receives the busy status updating request, wherein the response comprises the calling user identity, wherein the processing unit of the first presence agent is further configured to transmit an authorization request to the second presence agent for changing the status of the calling user identity into a busy status, wherein the second presence agent is configured to, in response to receiving the authorization request, send to the presence server an authorization message for changing the status of the calling user identity into a busy status, wherein the processing unit of the presence server is configured to change the status associated to the calling user identity into the busy status when the input interface of the presence server receives the authorization message from the second presence agents.

In an embodiment, the processing unit of the first presence agent is further configured to transmit an authorization request to the second presence agent for changing the status of the calling user identity into an available status in response to receiving a request for establishing a communication session between a calling device and a called device, wherein the processing unit of the second presence agent is configured to, when receiving the authorization request, send to the presence server an authorization message for changing the status of the calling user identity into an available status, wherein the processing unit of the presence server is further configured to, when the input interface of the presence server receives the authorization message from the second presence agent, change the status associated to the calling user identity into the available status.

Thanks to these features, a second user may confirm that a first user is indeed active in a communication session. Moreover, the second user is not allowed to change the first user's status without authorization.

BRIEF DESCRIPTION OF THE DRAWINGS

These and other aspects of the invention will be apparent from and elucidated with reference to the embodiments described hereinafter, by way of example, with reference to the drawings.

FIG. 4 illustrates the display of a user account record in a directory of the presence server;

DETAILED DESCRIPTION OF THE EMBODIMENTS

Figure 1:
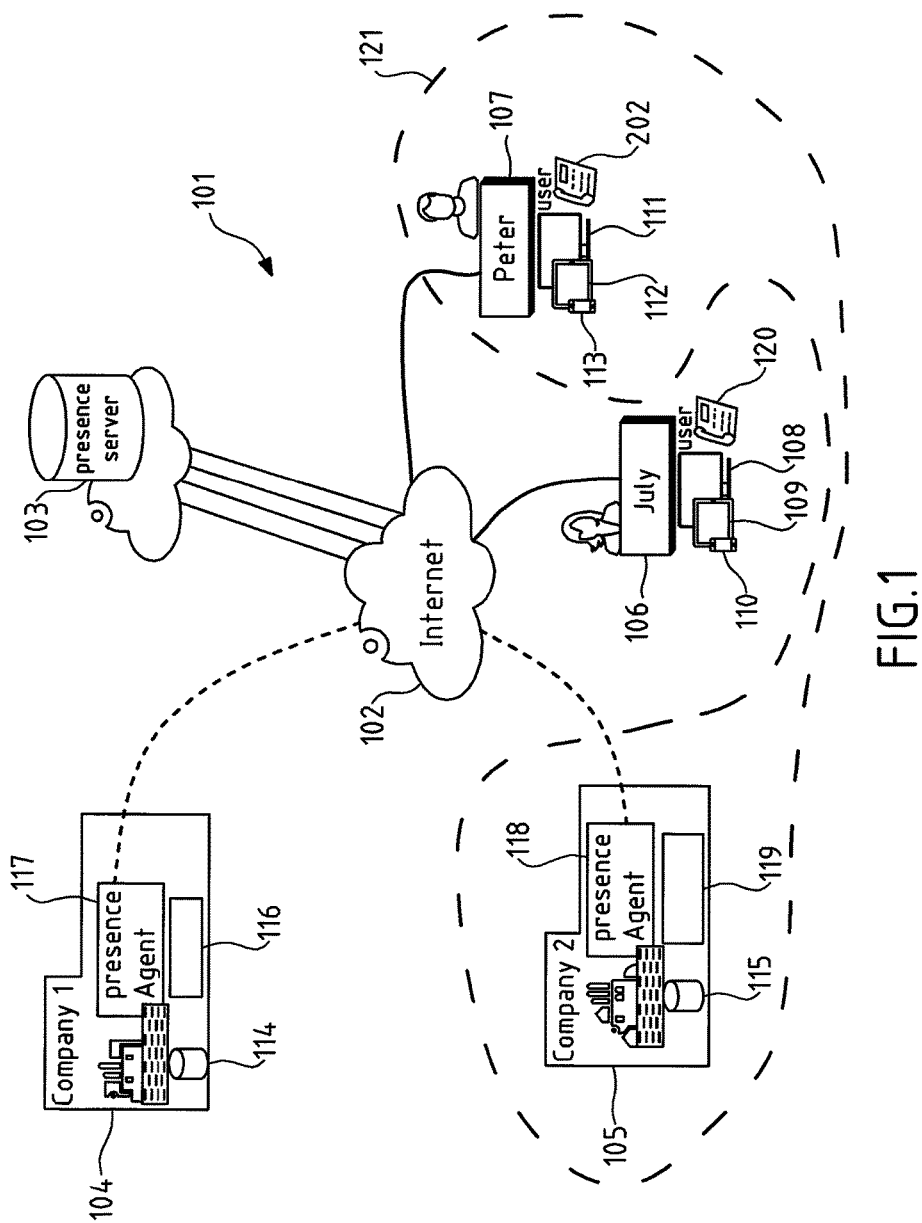
FIG. 1 schematically illustrates an example of a communication network according to an embodiment of the invention.

Now, with reference to FIG. 1, an example of a communication network 101 will be described. The communication network 101 is a public communication network comprising the internet 102 and a plurality of heterogeneous elements such as operator networks. A plurality of Private Branching Exchanges (PBXs) is connected to the internet 102 through network elements which are not described. For the sake of illustration, only two PBXs 104 and 105 are illustrated. The PBX 104 is associated to a first company: Company_1. The PBX 104 is a server dedicated to the establishment of communication sessions between a plurality of communication devices belonging to the Company_1. As used herein, a communication device "belonging" to a company means that the communication device is connected to a private communication network of the company by the PBX of the company, as more fully explained below in relation to FIG. 5. The plurality of communication devices of the Company_1 are interconnected and registered in the PBX 104 which routes the communication messages from and to them. The PBX 104 also enables the establishment of communication sessions between a communication device of the Company_1 and other communication devices connected to the communication network 101. Similarly, the plurality of communication devices of the Company_2 are interconnected and registered in the PBX 105 which routes the communication messages from and to them. The PBX 105 also enables the establishment of communication sessions between a communication device of the Company_2 and other communication devices connected to the communication network 101. For enabling the establishment of communication sessions, the PBX 104 and 105, comprise a processing and routing unit respectively 116 and 119.

Therefore, through the intermediate of the PBX 104 and the PBX 105, a first communication device of the Company_1 can communicate with a second communication device of the Company_2. For example, a user 106 called July employed by the Company_1 can communicate thanks to a mobile phone 110 belonging to the Company_1 with a user 107 called Peter employed by the Company_2 and using a deskphone 202 belonging to the Company_2. July can also use any of the following communication devices belonging to the Company_1: a computer 108 or deskphone 120 or a digital tablet 109. Similarly, Peter can also use any of the following communication devices belonging to the company_2: a computer 111 or mobile phone 113 or a digital tablet 112.

With reference again to FIG. 1, an example of a call session between July and Peter will be described. For example, July uses her professional deskphone 120 to call Peter on his professional deskphone 202. The call is routed by the telecom operator of the Company_1, for example the telecom operator "Orange", to the PBX 105, i.e. PBX of the call destination. The PBX of the call destination comprises functions to routes calls in the private communication network 121, as it is known in the art. Then, the processing and routing unit 119 of the PBX 105 routes the call in the private communication network 121 of the company_2 in order to reach the deskphone 202. The deskphone 202 rings and Peter picks up the phone to answer the call. The processing and routing unit 116 of the PBX 104, i.e. PBX of the call origin, is aware that a communication session involving the deskphone 120 is established. The processing and routing unit 119 of the PBX 104 is aware that a communication session involving the deskphone 202 is established.

The addresses of the communication devices 108, 109 and 110 which are belonging to the Company_1 are registered in a memory 114 of the PBX 104 and the addresses of the communication devices 111, 112, 113 and 202 which are belonging to the Company_2 are registered in a memory 115 of the PBX 105.

For example, the memory 114 of the PBX 104 comprises a look-up table as follows:

| Identifier of the communication device | Address of the communication device |
|---|---|
| 110 | Mobile phone number of the mobile phone 110 |
| 109 | IP address of the digital tablet 109 |
| 108 | IP address of the computer 108 |
| 120 | Phone number of the deskphone 120 |

The communication devices 108, 109, 110 and 120 are either equipped with a dedicated software application or directly connected to the PBX 104 for communicating with the PBX 104. The communication devices 111, 112, 113 and 202 are either equipped with a dedicated software application or directly connected to the PBX 105 for communicating with the PBX 105. Therefore, all communication devices of a company are connected to the PBX of the company, either by a wired connection or a wireless connection.

Moreover, the PBX 105 comprises identity information about users belonging to the Company_2 but no identity information about users belonging to the Company_1. Similarly, the PBX 104 comprises identity information about users belonging to the Company_1 but no identity information about users belonging to the Company_2. Such identity information is stored in association with the communication devices registered in the look-up table in the memories 114 and 115 of respectively the PBX 104 and 105. For example, in the memory 115 of the PBX 105, Peter is registered as a user of the following communication devices of the Company_2: the computer 111, the digital tablet 112, the mobile phone 113 and the deskphone 202.

Figure 5:
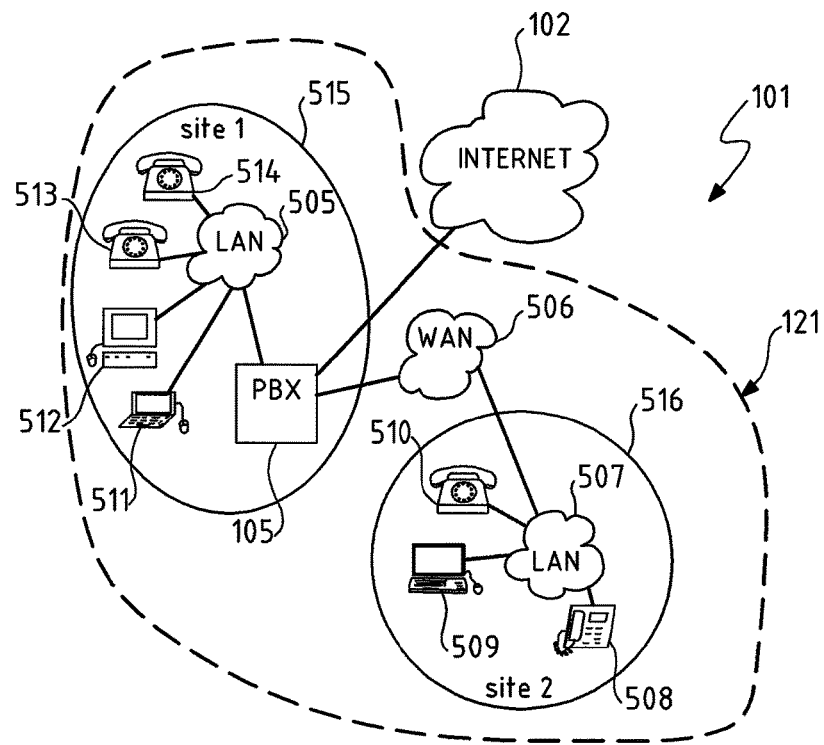
FIG. 5 schematically illustrates the private network and PBX of a company which is located in two different sites.

While FIG. 1 is a very simplified overview of the communication network 101, FIG. 5 provides a more detailed implementation of an example of a private communication network that can be employed in the communication network of FIG. 1. Elements that are identical or similar to those of FIG. 1 are designated by the same reference numeral as in FIG. 1. FIG. 5 illustrates the private communication network 121 for the example of a two-site company. In a first site 515 of the company, a plurality of communication terminals 511, 512, 513 and 514 are connected through a Local Area Network (LAN) 505. In a second site 516 of the company, a plurality of communication terminals 510, 509 and 508 are connected through a Local Area Network (LAN) 507. The two sites 515 and 516 are interconnected through a Wide Area Network (WAN) 506 to form a secured virtual private network (VPN). An internal communication session between any two of the communication terminals of the private communication network 121 of the company is established through the PBX 105, which is a communication switch. Besides, the PBX 105 is also an endpoint of external networks, i.e. other networks than the private communication network 121. In the example pictured on FIG. 5, an external network is the internet 102. Therefore, the PBX 105 is configured as an interface between the private communication network 121 and external communication networks. Any other private communication network than the private communication network of the FIG. 5 may be contemplated as well without departing from the scope of the invention.

Now, with reference to FIG. 8, a presence system will be described. The presence system comprises the presence server 103 and presence agents 117 and 118 comprised in the PBXs 104 and 105 of the communication network 101. The presence server 103 is connected to the presence agents 117 and 118. Namely, the presence server 103 has a bidirectional network interface that serves both as an input interface for receiving messages from the presence agents 117 and 118 and as an output interface for transmitting messages to the presence agents 117 and 118.

For example, a user account record is created by a user for Peter in the presence server 103, associated to the following identity: Peter@Company_2. The presence server 103 then updates a directory of the presence agent 118.

The directory of the presence agent 118 may looks as follows:

| Identity | Communication addresses |
|---|---|
| Peter@Company_2 | Phone number of the communication device 113 |
| Peter@Company_2 | Phone number of the deskphone 202: 03 90 67 51 17 |

The directory of the presence agent 118 is an extract of a user account directory of the presence server 103. The presence server 103 comprises a database 800 in which is stored the user account directory. The user account directory comprises communication addresses of communication devices of the communication network 101 for all the users of the presence system. The registered communication addresses are stored in association with identities of the users of the presence system. Below is an example of such a user account directory:

| Identity | Communication addresses |
|---|---|
| July@Company_1 | Phone number of the deskphone 120 |
| July@Company_1 | IP address of the communication device 108 |
| July@Company_1 | Phone number of the communication device 110 |
| Peter@Company_2 | Phone number of the communication device 113 |
| Peter@Company_2 | Phone number of the deskphone 202: 03 90 67 51 17 |
| July@Company_1 | Phone number of a personal mobile phone 201: 06 19 19 19 19 |

This directory is directly updated by the users. The user account record registered in the database 800 of the presence server 103 may associate any other information to a user identity, as it will be later described with reference to FIG. 4.

In another embodiment, the presence agent 118 creates in the presence server 103 a user account record from its own directory.

The presence server 103 further comprises an Extensible Messaging and Presence Protocol (XMPP) server 801 comprising a message bus that can transport requests and presence messages. The message bus routes presence messages. The presence server 103 is not directly communicating with Internet Service Providers' networks but with presence agents such as presence agents 117 and 118 through a webportal (not represented). The two presence agents 117 and 118 are two terminations of the message bus of the XMPP server 801.

The last line of the directory stored in the database 800 shows that the identity July@Company_1 is registered in association with the phone number of July's personal mobile phone 201. For example, July has saved the phone number of her personal mobile phone in the database 800 when creating or updating her user account, as it will be later explained with reference to FIG. 3. However, July's personal mobile phone is not handled by the PBX 104 of the Company_1. Therefore, the phone number of July's personal mobile phone is not registered in the memory 114 of the PBX 104. Moreover, July's personal mobile phone does not support any software application to communicate with the PBX 104. However, the personal mobile phone of July is also connected to the communication network 101.

Figure 2:
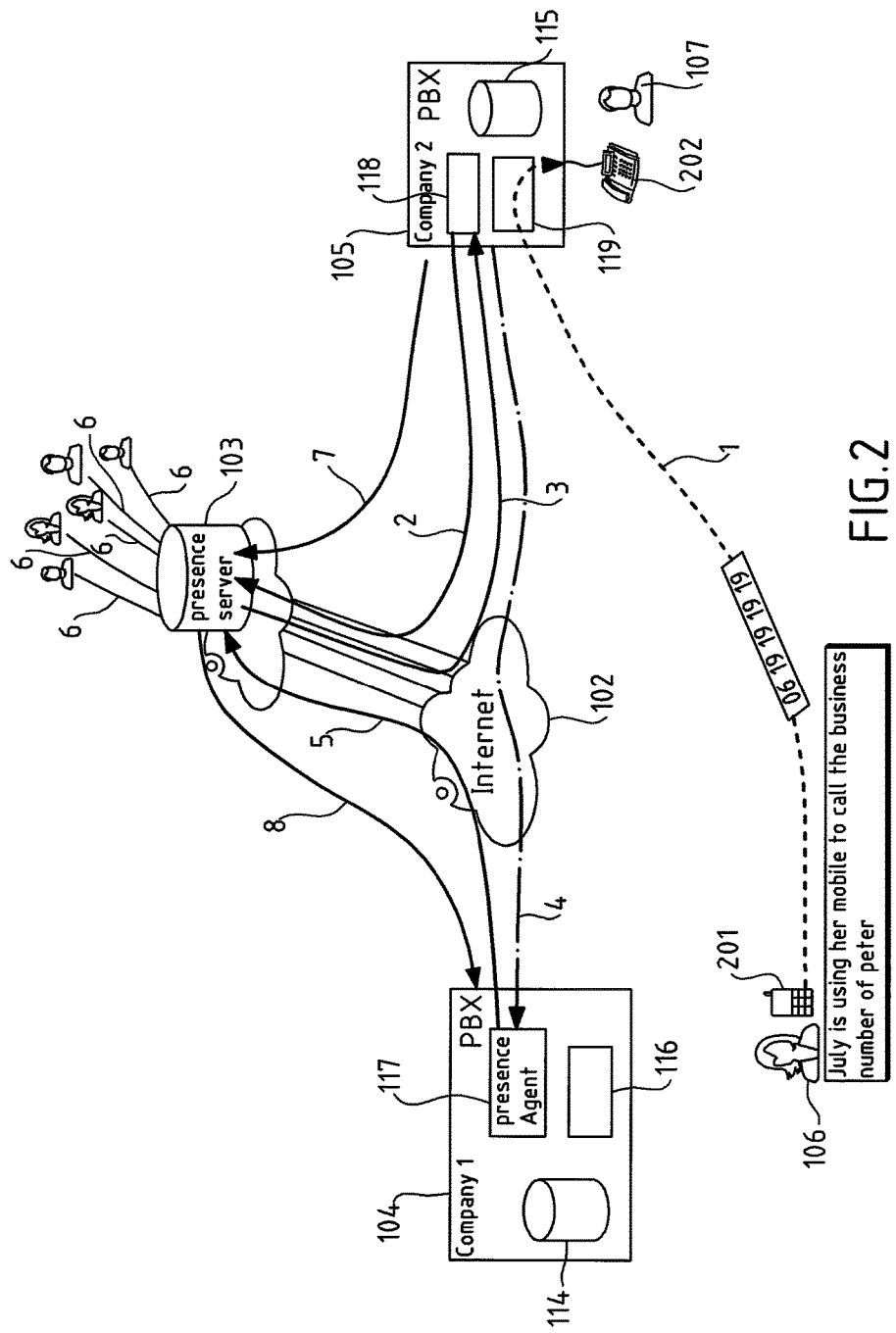
FIG. 2 schematically illustrates a presence updating mechanism taking place within the communication network of the FIG. 1, according to an embodiment.

Now, with reference to FIG. 2, a presence updating mechanism taking place within the communication network 101 of the FIG. 1 will be described. The mechanism takes place in several steps that will be described below.

First of all, the user July 106 uses her personal mobile phone 201 to initiate a call to the user Peter 107 on his deskphone 202. Therefore, July dials the phone number of the deskphone 202. The personal mobile phone 201 of July is connected to a first operator network, which is the network of the operator of July's personal mobile phone 201. The first operator network then connects a second operator network through a public network. The second operator network is the network of the operator of the deskphone 202. The second operator network routes the call to the PBX 105 of the Company_2. The PBX 105 of the Company_2 receives the call in the processing and routing unit 119 which determines that the call is intended to the user Peter 107.

The initiation request call represented by the arrow 1 comprises the calling phone number, i.e. the phone number of the personal mobile phone 201, and the called phone number, i.e. the phone number of the deskphone 202, in a known manner.

As explained above, the memory 115 comprises a record of the phone number of the deskphone 202 and the processing and routing unit 119 retrieves the company's registered communication device addresses in the memory 115. Therefore, the PBX 105 routes the call to the deskphone 202 of the user Peter 107.

A communication session is established. For example, the communication session is established through a Session Initiation Protocol (SIP) protocol and the communication of data between the calling device and the called device is enabled by transmission of Real Time Protocol (RTP) packets. The communication between a PBX and an operator network can take place with any protocol, for example SIP or ISDN protocols.

The establishment of the communication session triggers a second step, which is performed by the presence agent 118.

Firstly, the presence agent 118 retrieves the identity of the user of the called communication device, i.e. the deskphone 202, in the directory of the presence agent 118. The presence agent 118 determines that the identity is Peter@Company_2.

Secondly, the presence agent 118 sends an ID request to the presence server 103 in order to get the identity of the user associated to the phone number of the calling communication device (06 19 19 19 19), i.e. the mobile phone 201.

The ID request 2 comprises the following information:
The phone number of the calling device, i.e. the mobile phone 201, in order to ask for the associated identity, and
The identity of the called user, i.e. Peter@Company_2, in order to change the status of the called user, i.e. Peter.
For example, the ID request 2 may have a SQL format.
When receiving the ID request 2, the presence server 103 is configured to:
retrieve in the directory of the presence server 103 the identity associated to the phone number of the mobile phone 201, which is the calling device, and
change the presence status of the identity Peter@Company_2. In a preferred embodiment, the presence status of the identity Peter@Company_2 is changed by a disjoint request from the presence agent 118 (not represented).
The retrieved identity is July@Company_1 and the status associated to the identity Peter@Company_2 is changed from "available" to "busy".

In the following step, the presence server 103 sends a response 3 to the presence agent 118, as represented by the arrow 3 from the presence server 103 to the presence agent 118. The response 3 comprises the identity July@Company_1, which is associated to the phone number of the mobile phone 201.

For example, the ID request 2 and the response 3 are Extensible Markup Language (XML) request and response.

Then the presence agent 118 of the PBX 105 of the Company_2 sends to the presence agent 117 of the PBX 104 of the Company_1 an authorization request, shown by arrow 4, comprising the identity July@Company_1 for warning that the user associated to the identity July@Company_1 is currently busy. The routing of the authorization request 4 is performed by the XMPP server thanks to the identity July@Company_1. For example, the identity July@Company_1 comprises the domain name of the PBX 104 (Company_1) and an XMPP protocol solves the domain name in a same way as a Domain Name System (DNS). Other methods are possible, for example database relation mechanisms between identities of users, shared identities etc.

Then the presence agent 117 of the PBX 104 of the Company_1 sends to the presence server 103 an authorization message 5 for changing the status of the user associated to the identity July@Company_1 from "available" to "busy". Optionally, the authorization message 5 also comprises the information that the presence agent 118 has checked that the identity July@Company_1 is busy because a communication session is really opened with the user associated to the identity Peter@Company_2.

Then, the presence server changes the status of the identity July@Company_1 from "available" to "busy" in the database 800 by receiving the authorization message 5.

The configuration process of the presence system after the communication session is over will now be explained.

Upon detecting that the call is over, the presence agent 118 of the PBX 105 requests the presence server 103 to update the status of the identities July@Company_1 and Peter@Company_2 back from "busy" to "available" in a request 7, thanks to a similar exchange of messages as above described for updating the status from "available" to "busy". The presence server 103 then changes the status for the identity Peter@Company_2 and requests the authorization for changing the status for the identity July@Company_1 by sending a request 8 to the presence agent 117 of the PBX 104 before updating the status of the identity July@Company_1.

In a last step, the presence server 103 broadcasts the updated status of the identities July@Company_1 and Peter@Company_2 to all users of the presence system, as shown by arrows 6, through a suitable endpoint interface, e.g. a TCP/IP network interface.

Figure 7:
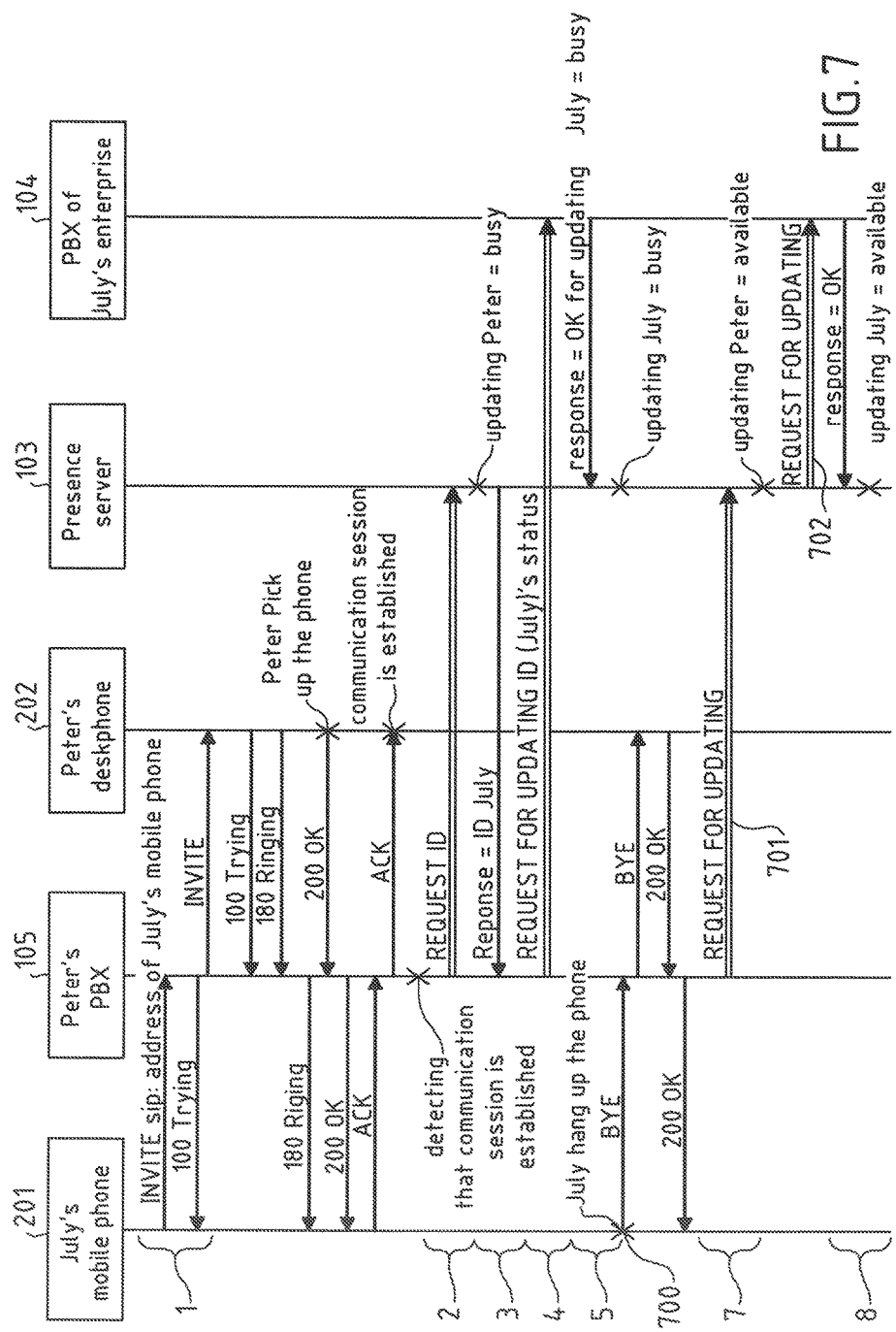
FIG. 7 is a call flow of the presence updating mechanism of FIG. 2 for the example of a SIP protocol.

The above described steps are detailed on a call flow on FIG. 7 for the example of a SIP communication session. Messages 1 to 5 and 7 to 8 are pictured by brackets. Step 700 represents the termination of the call session.

A first functionality of the presence server 103 has been hereinabove described which is updating presence status of users. Now, a second functionality of the presence server 103 will be described which is accessing the updated presence status.

Figure 9:
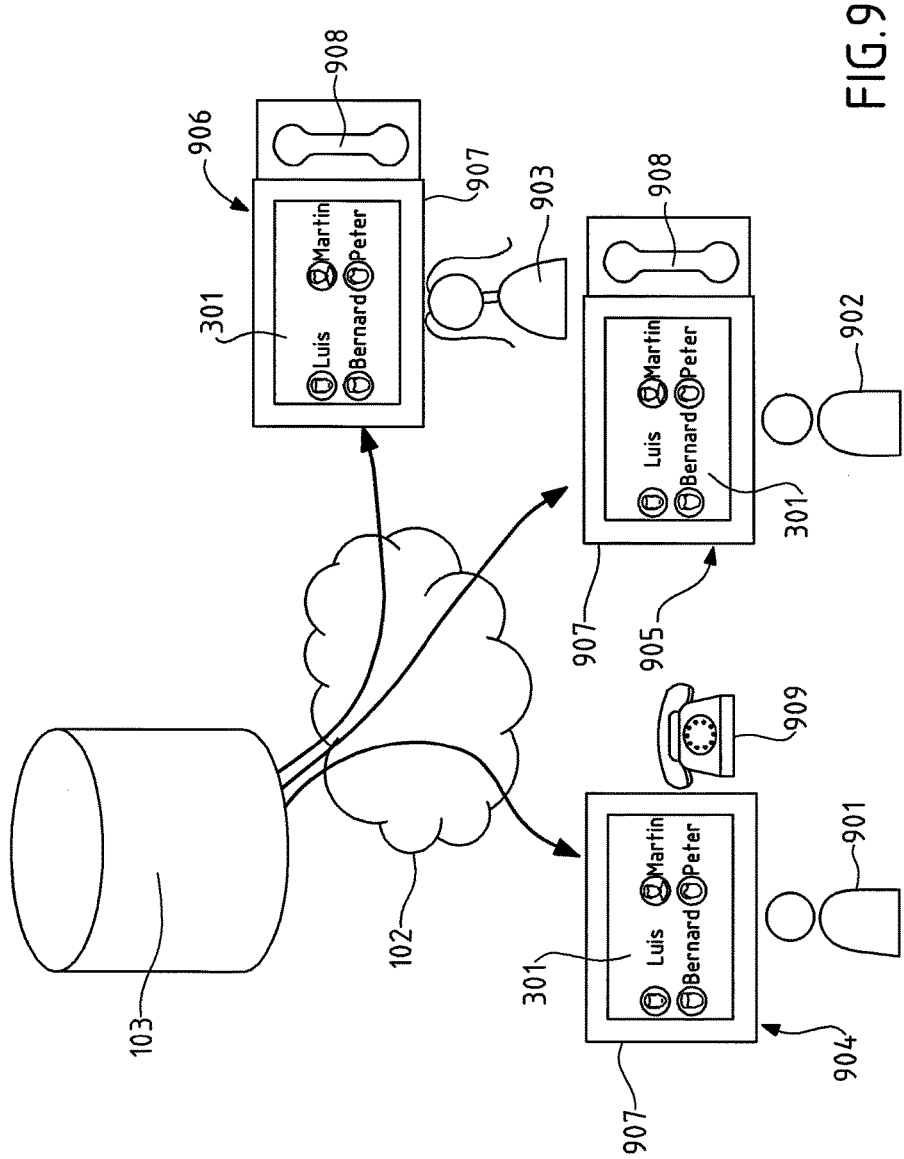

The users can access the status information through their communication terminals or other devices generally referred to as display endpoints in the description of FIG. 9. The communication system 101 includes the display endpoints for end users to access the status information stored and updated by the presence server 103. In order to communicate with the display endpoints, the presence server 103 has a suitable output interface, e.g. a TCP/IP network interface. A user may use a display endpoint disjoint from a communication device, i.e. consult the status information on a first communication device, which is a display endpoint, e.g. a computer, and call with a second communication device, for example a phone device. A user may also use a same communication device for consulting the status information and for calling.

FIG. 9 represents communication terminals of users accessing to the presence server 103 in order to get the status information. Users 901, 902 and 903 are represented, each using a display endpoint 904, 905 and 906 able to display on a display interface 301 information status retrieved from the presence server 103 through the internet 102. The display endpoints 905 and 906 are equipped with both a display screen 907 and a phone 908.

A display endpoint may be implemented separately from the communication terminals. For example, the display endpoint 904 is equipped with a screen 907 but not with vocal communication means. For example, the user 901 uses a separate phone 909 to call. The display endpoint 904 is a computer having access to the internet 102 in order to get the status information and to display it on the screen 907. The phone 909 has his phone number registered in the presence server 103 in association with the identity of the user 901 in order to allow retrieving the presence status of the user 901.

Figure 3:
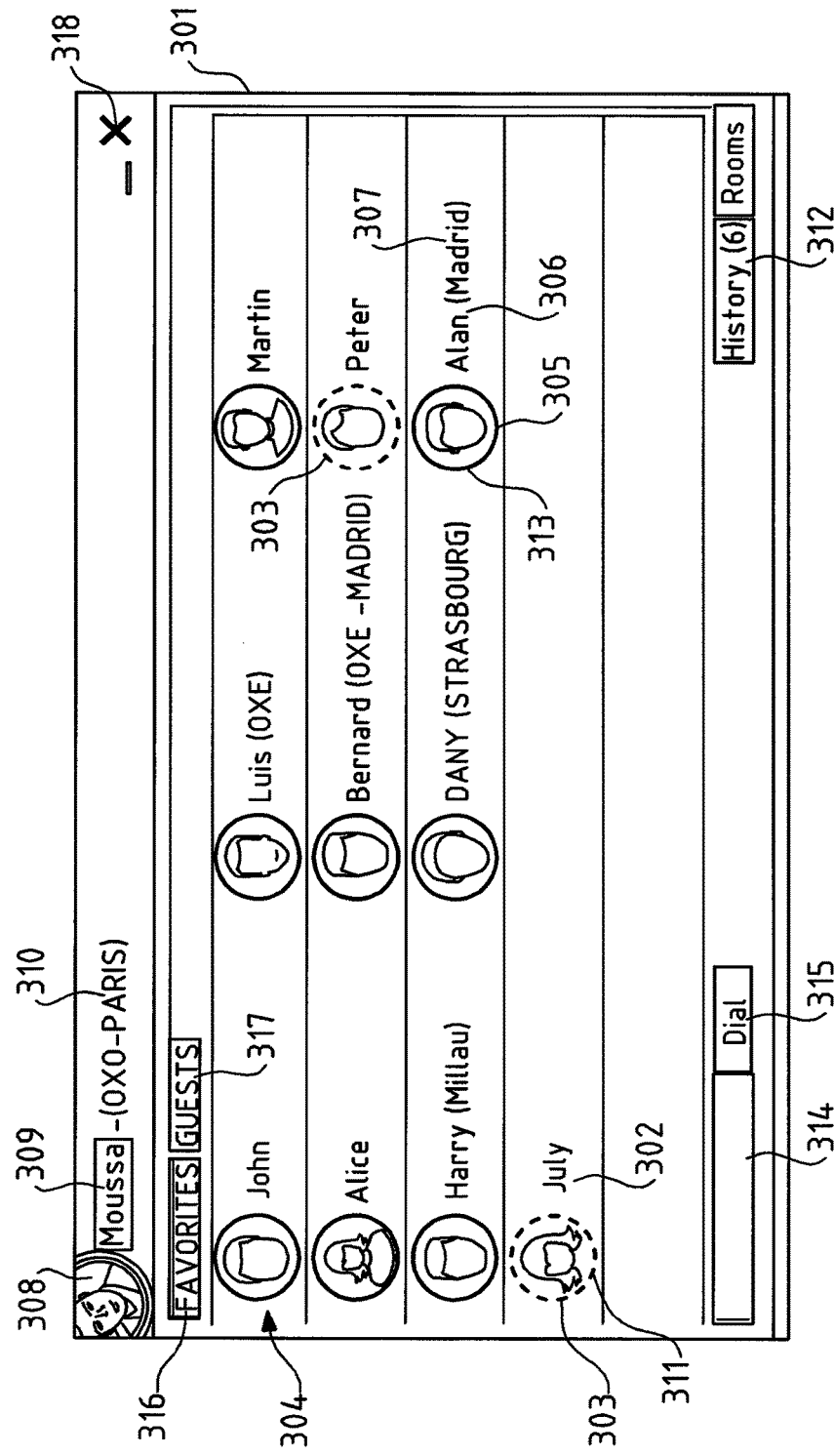
FIG. 3 is an interface display for accessing presence status of users.

Now, with reference to FIG. 3, a picture of the display interface 301 for displaying presence status of users according to an embodiment will be described. The interface display is run by a software application which is hosted in the presence server 103. A connected user accesses the display interface 301 by launching the software application on a communication terminal or a display endpoint whose address may or may not be registered in the directory of the presence server in association with the connected user's identity. However, the connected user is registered in the directory of the presence server 103 in association with one or more communication devices' addresses. As previously explained, the communication devices for calling, registered in the presence server 103, and the display endpoints for accessing status information, equipped with a display screen, may be collocated or disjoint. The connected user may log on the software application with a personal login and password.

The display interface 301 is displayed on the screen 907 of the display endpoint of the connected user. The interface displays a list 304 of user's identities, each being a character string, and each being associated to a personal picture. For example, a first user identity 302 is displayed beside a personal picture 303. The presence status of a user may be indicated in any suitable way. In the example shown, the presence status of a user is specified by a colored circle around the personal picture of the user. A color code is used to associate the color surrounding the personal picture of a user to the presence status of the user. For example, the personal picture 303 is surrounded by a red circle, represented by dotted line, which means that the user's identity which is the first user identity 302 is busy. By contrast, the personal picture 305 is surrounded by a grey circle 313, represented by full line, which means that the user the personal identity of which is the user identity 306 is available. The interface also provides the connected user with the location of the users, when possible. For example, next to a second user identity which is associated to the personal picture 305 is displayed a character string of a location name 307.

Thanks to the color code, the connected user is aware of the presence status of the users whose user identities are displayed.

The display interface 301 also provides tabs 316, 317, 312, 315 for accessing different functionalities when the connected user clicks, for example with a mouse pointer or the finger on a touchscreen display. The tab 316 allows the connected user accessing the presence status of users whose user identities have been selected by the connected user as favorite user identities. The tab 317 allows the connected user accessing the presence status of guest users. The tab 312 allows the connected user to display the call log. The window also displays a text input box 314 in order to allow the connected user inputting a phone number and, by clicking on the tab 315, calling someone who may or may not be registered in the presence server 103.

The display interface 301 is personalized for the connected user's account. For example, the display interface 301 displays a personal picture 308 of the user, the identity 309 of the user and the location 310 of the user in the upper left hand corner.

The connected user can close the display interface 301 by clicking on an icon 318, for example to log off the software application.

Thanks to these features, status information of the users can be made available throughout a plurality of private communication networks. Namely, users of the private network of a first company can access status information of the users of the private network of a second company.

Now, with reference to FIG. 4, the display window 401 of a user account record in a directory of the presence server 103 will be described. More precisely, the user account record is changeable by the connected user which owes the user account. A plurality of text input boxes 404 may be filled. Namely, the user account record associates the connected user identity 309 to one or more phone numbers 405, 402, 403.

Figure 6:
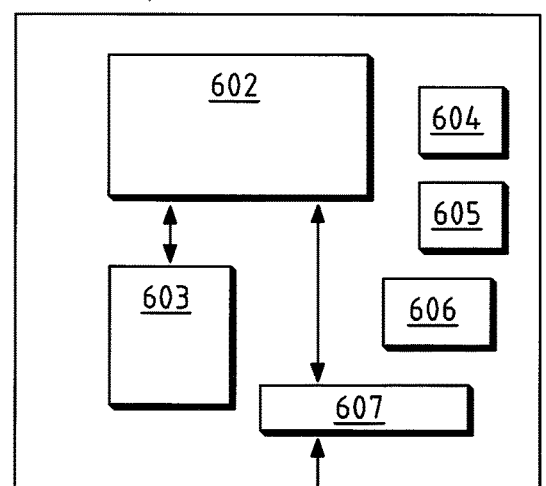
FIG. 6 schematically illustrates a computing device.

FIG. 6 illustrates a computing device 601 which can be used for implementing any of the following: communication devices, communication terminals, display endpoints, presence server 103, network switch and PBX. The computing device 601 comprises a data repository 602 connected to a processing unit 603 and to a communication interface 607. For example, the data repository is a hard drive, a ROM, a RAM or other. The computing device 601 also comprises an input device 604, an output device 605 and an analog-to-digital and/or digital-to-analog converter 606. In embodiments, the input device 604 is a mouse, a joystick, a touch screen, a voice recorder etc. In embodiments, the output device 605 is a display device such as a two-dimensional screen or a three-dimensional screen. Further output devices may be employed such as a loudspeaker, or a Braille computer display, speech synthesizer etc. The communication interface 607 is connected to other devices and/or to the Internet in various manners, e.g. through a wired and/or a wireless connection, e.g. Wifi, Bluetooth, etc.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software.

The communication devices, communication terminals, display endpoints, presence server, network switches, PBXs, XMPP servers, processing units, presence agents, described hereinabove may be implemented through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, the term "processor", "presence agent" or "processing unit" should not be construed to refer exclusively to hardware capable of executing software, and may implicitly include, without limitation, central processing unit (CPU), digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. The communication devices, communication terminals, display endpoints, presence server, data repositories, databases, memories, network switches, PBX described hereinabove may be implemented in a unitary manner or in a distributed manner.

In the claims, any reference signs placed between parentheses shall not be construed as limiting the scope of the claims.

The invention claimed is:

1. In a communication system comprising:
  a presence server comprising a directory of users of the communication system, the directory of users comprising a plurality of user identities, each user identity identifying a user in association with at least one terminal address, and each user identity being associated with a presence status that is either busy or available, wherein the users of the communication system may update information in relation to their identity and associated terminals through display endpoints;
  a first Private Branching eXchange (PBX) comprising a first presence agent, the first presence agent comprising a first database comprising a plurality of user identities, each user identity, of the first database, identifying a user in association with at least one terminal address of a terminal connected to the first PBX; and
  a second PBX comprising a second presence agent, the second presence agent comprising a second database comprising a plurality of user identities, each user identity, of the second database, identifying a user in association with at least one terminal address of a terminal connected to the second PBX, wherein the presence server, the first presence agent, and the second presence agent are interconnected via a messaging and signaling system and protocol,
  a method of updating presence information in the communication system associated with a first user using a first terminal which is not connected to the first PBX to place a call to a second user using a second terminal connected to the second PBX, the method comprising the steps of:
    the first user updating information in relation to its identity and the associated first terminal in the directory of the presence server;
    routing the call, comprising the information of a number of the first terminal and a number of the second terminal, to the second PBX;
    the second PBX routing the call to the second terminal;
    the second presence agent retrieving in the second database the identity of the second user;
    the second presence agent sending to the presence server a request for identity of the first user, the request comprising the number of the first terminal and the identity of the second user;
    the presence server retrieving in the directory the identity of the first user;
    the presence server changing in the directory a presence status for the second user from available to busy;
    the presence server sending to the second presence agent the identity of the first user;
    the second presence agent sending to the first presence agent information that the first user should have a presence status of busy;
    the first presence agent sending to the presence server a request for changing the presence status for the first user; and
    the presence server changing in the directory a presence status for the first user from available to busy.

2. The method of claim 1, further comprising, upon the call ending, the steps of:
- the second presence agent sending to the presence server a request to change the presence status for both the first user and the second user from busy to available;
- the presence server changing in the directory the presence status for the second user from busy to available;
- the presence server sending to the first presence agent a request for authorization to change the presence status of the first user; and
- upon authorization received from the first presence agent, the presence server changing in the directory the presence status for the first user from busy to available.

3. The method of claim 1, further comprising the step of the presence server broadcasting, in the communication system, the presence status for both the first user and the second user.

4. The method of claim 1, wherein the messaging and signaling system and protocol is the Extensible Messaging and Presence Protocol (XMPP).

5. The method of claim 4, wherein user identities in the directory, the first database and the second database are Jabber Unique Identifiers (JID).

6. The method of claim 1, wherein exchanges between the presence server, the first presence agent and the second presence agent are in the Extensible Markup Language (XML) format.

7. A presence system in a communication system comprising:
- a presence server comprising a directory of users on the communication system, the directory of users comprising a plurality of user identities, each user identity identifying a user in association with at least one terminal address, and each user identity being associated with a presence status that is either busy or available, wherein the users of the communication system may update information in relation to their identity and associated terminals through display endpoints;
- a first presence agent associated with a first Private Branching eXchange (PBX), the first presence agent comprising a first database comprising a plurality of user identities, each user identity identifying a user in association with at least one terminal address of a terminal connected to the first PBX; and
- a second presence agent associated with a second PBX, the second presence agent comprising a second database comprising a plurality of user identities, each user identity identifying a user in association with at least one terminal address of a terminal connected to the second PBX,
- wherein the presence server, the first and the second presence agents are interconnected via a messaging and signaling system and protocol, and
- wherein the presence server is configured to, upon request from a first user using a first terminal which is not connected to the first PBX, update information in the directory in relation to the identity of the first user and the associated first terminal,
- wherein the second presence agent is configured to, upon the second PBX receiving from an operator a call and routing the call to a second terminal, wherein the call was placed by the first user using the first terminal and to a second user using the second terminal connected to the second PBX, and wherein the call comprises a number of the first terminal and a number of the second terminal;
  - retrieve in the second database the identity of the second user; and
  - send to the presence server a request for identity of the first user, the request comprising the number of the first terminal and the identity of the second user,
- wherein the presence server is further configured to, upon request from the second presence agent comprising the number of the first terminal and the identity of the second user:
  - retrieve in the directory the identity of the first user;
  - change in the directory a presence status for the second user from available to busy; and
  - return to the second presence agent the identity of the first user,
- wherein the second presence agent is further configured to:
  - receive from the presence server the identity of the first user; and
  - send to the first presence agent information that the first user should have a presence status of busy,
- wherein the first presence agent is configured to:
  - send to the presence server a request for changing the presence status for the first user from available to busy,
- and wherein the presence server is yet further configured to, upon request from the first presence agent:
  - change in the directory a presence status for the first user from available to busy.

8. The presence system of claim 7, wherein:
- the second presence agent is further configured to, upon the call ending, send to the presence server a request to change the presence status for both the first user and the second user from busy to available,
- wherein the presence server is further configured to:
  - change in the directory the presence status for the second user from busy to available;
  - send to the first presence agent a request for authorization to change the presence status of the first user; and
  - upon receiving authorization from the first presence agent, change in the directory the presence status for the first user from busy to available.

9. The presence system of claim 7, wherein the presence server is further configured to broadcast in the communication system the presence status for both the first user and the second user.

10. The presence system of claim 7, wherein the messaging and signaling system and protocol is the Extensible Messaging and Presence Protocol (XMPP).

11. The presence system of claim 10, wherein user identities in the directory, the first database and the second database are Jabber Unique Identifiers (JID).

12. The presence system of claim 10, wherein the exchanges between the presence server, the first presence agent and the second presence agent are in the Extensible Markup Language (XML) format.

* * * * *

UNITED STATES PATENT AND TRADEMARK OFFICE
CERTIFICATE OF CORRECTION

PATENT NO. : 10,320,974 B2
APPLICATION NO. : 15/775493
DATED : June 11, 2019
INVENTOR(S) : Moussa Zaghdoud Page 1 of 1

It is certified that error appears in the above-identified patent and that said Letters Patent is hereby corrected as shown below:

In the Drawings

Figure 8:
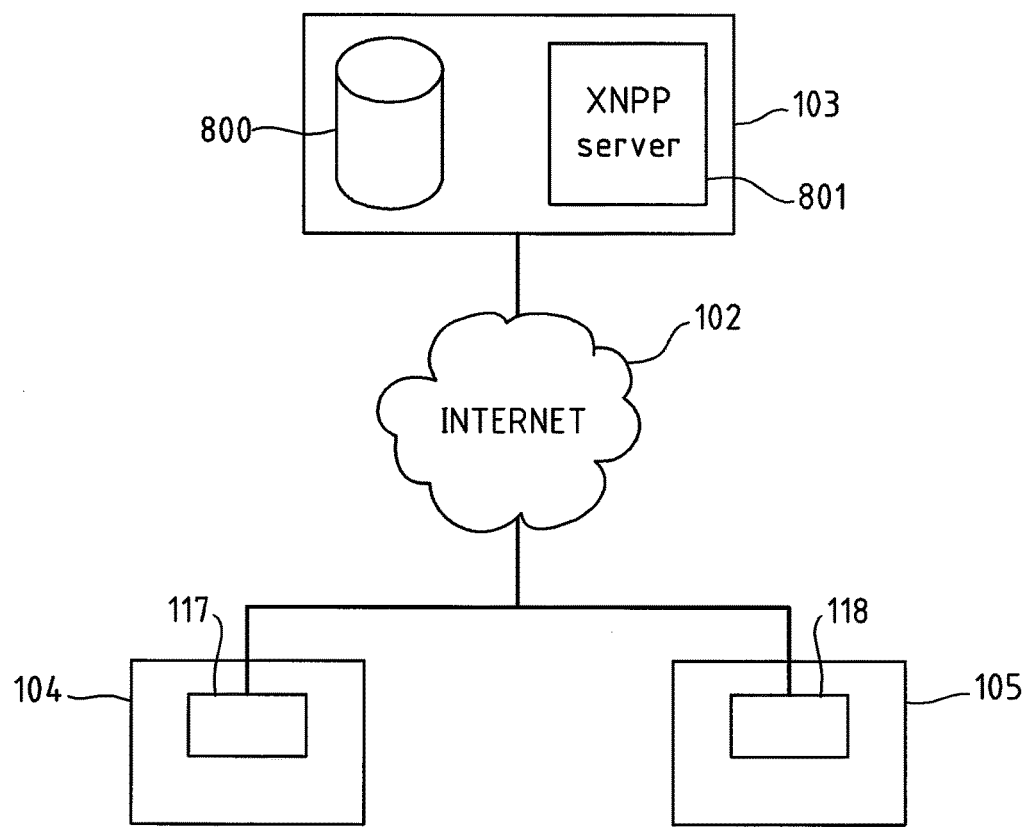
FIG. 8 schematically illustrates a presence system comprising presence agents and a presence server, FIG. 9 schematically illustrates users accessing presence status of other users via the interface display represented on FIG. 3.

Sheet 7, Fig. 8, please change "XNPP server" to --XMPP server--

Signed and Sealed this
Fourth Day of February, 2020

Andrei Iancu
*Director of the United States Patent and Trademark Office*